United States Patent
Asakura et al.

(10) Patent No.: US 7,714,969 B2
(45) Date of Patent: May 11, 2010

(54) LIQUID CRYSTAL DISPLAY DEVICE

(75) Inventors: Toshiki Asakura, Togane (JP); Masato Shimura, Mobara (JP); Makiko Imabayashi, Mobara (JP); Takanori Nakayama, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 111 days.

(21) Appl. No.: 12/169,663

(22) Filed: Jul. 9, 2008

(65) Prior Publication Data
US 2009/0015774 A1   Jan. 15, 2009

(30) Foreign Application Priority Data
Jul. 13, 2007   (JP)   ............... 2007-183910

(51) Int. Cl.
*G02F 1/1343*   (2006.01)
(52) U.S. Cl. ........................... 349/141; 349/139
(58) Field of Classification Search .............. 349/138, 349/139, 141–144, 147
See application file for complete search history.

(56) References Cited
U.S. PATENT DOCUMENTS
7,088,409 B2   8/2006   Itou et al.
7,227,606 B2 *   6/2007   Takeda et al. ............... 349/139
7,511,789 B2 *   3/2009   Inoue et al. .................. 349/129

FOREIGN PATENT DOCUMENTS
JP   2005-338256   12/2005

* cited by examiner

*Primary Examiner*—Hemang Sanghavi
(74) *Attorney, Agent, or Firm*—Antonelli, Terry, Stout & Kraus, LLP.

(57) ABSTRACT

In a liquid crystal display device having a first planar electrode and a second electrode formed on the first electrode with an insulating film in between, the response time of a liquid crystal is made shorter than that in a related art.

A liquid crystal display device includes: a first substrate having a first electrode, an insulating film provided in an upper layer than the first electrode, and a second electrode provided in an upper layer than the insulating film; a second substrate; and a liquid crystal sandwiched between the first substrate and the second substrate. The liquid crystal display device drives the liquid crystal by generating an electric field by the first electrode and the second electrode. The second electrode has plural slits closed at both ends, the first electrode is a planar electrode superimposed on the plural slits, and, given that the length of the respective slits is Ls, the length Ls of the respective slits satisfies $12\,\mu m \leq Ls \leq 30\,\mu m$, more preferably, $12\,\mu m \leq Ls \leq 20\,\mu m$.

13 Claims, 7 Drawing Sheets

LIQUID CRYSTAL DISPLAY DEVICE

The present application claims priority from Japanese application JP2007-183910 filed on Jul. 13, 2007, the content of which is hereby incorporated by reference into this application.

BACKGROUND OF THE INVENTION

The present invention relates to a liquid crystal display device, and specifically, to an effective technology applied to a liquid crystal display panel of high-definition IPS system.

An IPS (In-Plane-Switching) system (also referred to as lateral-field system) liquid crystal display panel displays an image by generating an electric field in parallel to substrates at least in part between a pixel electrode and an opposite electrode, driving a liquid crystal with the electric field, and modulating light transmitted through the liquid crystal layer.

An IPS liquid crystal display panel that includes a planar opposite electrode and a pixel electrode having a linear part formed with an insulating film in between, and displays an image by generating an electric field between the planar opposite electrode and the pixel electrode having the linear part, driving a liquid crystal with the electric field, and modulating light transmitted through the liquid crystal layer is known (see Patent Document 1 as below).

The following publication is cited as a related art document to the present invention.

[Patent Document 1] JP-A-2005-338256

SUMMARY OF THE INVENTION

Not only in the IPS liquid crystal display panel but in liquid crystal display panels, liquid crystal molecules are rotated for image display. Accordingly, when an image to be displayed on the liquid crystal display panel changes from "white" to "black" or "black" to "white", the image changes from "white" to "black" or "black" to "white" after a certain response time.

Figure 8A:
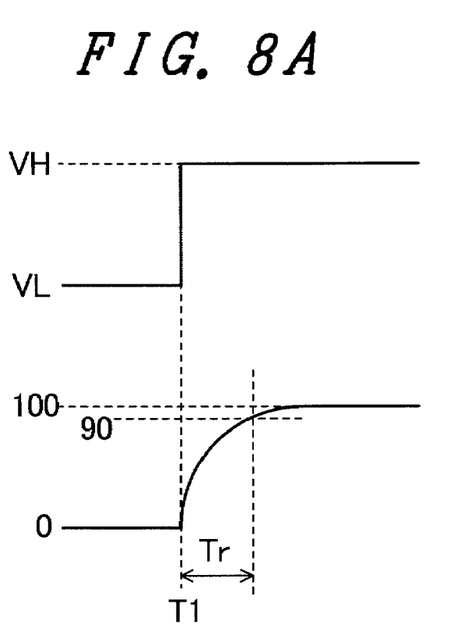
FIGS. 8A and 8B are diagrams for explanation of the response time of the liquid crystal.

For example, as shown in FIG. 8A, when the video voltage applied to the pixel electrode of the liquid crystal display panel is changed from Low-level of "VL" to High-level "VH" to change the image displayed on the liquid crystal display panel from "black" to "white", the image displayed on the liquid crystal display panel changes from "black" to "white" after a predetermined time from the time (T1) when the voltage changes from "VL" to "VH".

Figure 8B:
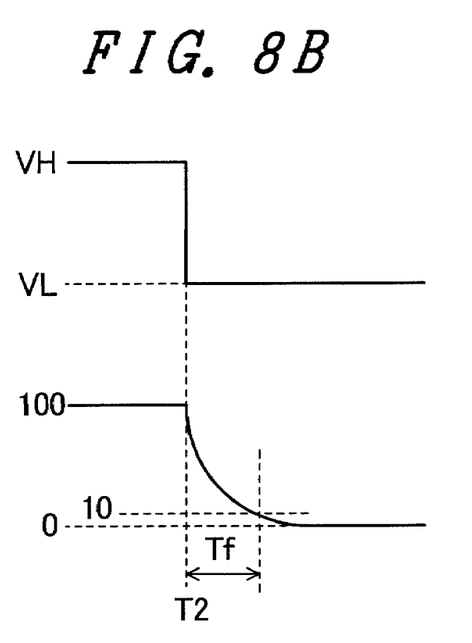

Similarly, as shown in FIG. 8B, when the video voltage applied to the pixel electrode of the liquid crystal display panel is changed from High-level "VH" to Low-level of "VL" to change the image displayed on the liquid crystal display panel from "white" to "black", the image displayed on the liquid crystal display panel changes from "white" to "black" after a predetermined time from the time (T2) when the voltage changes from "VH" to "VL". FIGS. 8A and 8B are diagrams for explanation of an IPS liquid crystal display panel having normally black characteristics is explained.

In order to improve the moving image characteristics of the liquid crystal display panel, it is necessary to reduce the response time of the liquid crystal until the image displayed on the liquid crystal display panel changes from "white" to "black" or "black" to "white".

To reduce the response time of the liquid crystal, reducing the gap length of the liquid crystal display panel is especially effective. However, if the gap length of the liquid crystal display panel is reduced, there has been a problem that the defective fraction due to foreign materials inserted into the liquid crystal display panel becomes higher and the yield becomes lower.

The invention has been achieved to solve the related art problem, and a purpose of the invention is provide a technology that can make the response time of a liquid crystal shorter than that in the related art in a liquid crystal display device having a first planar electrode and a second electrode formed on the first electrode with an insulating film in between.

The above described and other purposes and novel features of the invention will be made clear by the description of the specification and the drawings attached hereto.

Inventors of the application has found that, in a liquid crystal display device having a first planar electrode and a second electrode formed on the first electrode with an insulating film in between, there is a correlation between the length of a slit of the second electrode (or the length of a comb-like electrode) and the liquid crystal response time.

The invention has been achieved based on the above knowledge, and the summary of the representative features of the invention disclosed in this application is as follows.

(1) A liquid crystal display device includes: a first substrate having a first electrode, an insulating film provided in an upper layer than the first electrode, and a second electrode provided in an upper layer than the insulating film; a second substrate; and a liquid crystal sandwiched between the first substrate and the second substrate. The liquid crystal display device drives the liquid crystal by generating an electric field by the first electrode and the second electrode. The second electrode has plural slits closed at both ends, the first electrode is a planar electrode superimposed on the plural slits, and given that the length of the respective slits is Ls, the length Ls of the respective slits satisfies $12\ \mu m \leq Ls \leq 30\ \mu m$.

(2) In (1), the length Ls of the respective slits satisfies $12\ \mu m \leq Ls \leq 20\ \mu m$.

(3) In (1) or (2), the first substrate has video lines, and the plural slits are formed along a direction in which the video lines extend and provided at predetermined intervals in a direction perpendicular to the video lines.

(4) In (1) or (2), the first substrate has video lines, and the plural slits are formed at angles except 0° and 90° relative to a direction perpendicular to the video lines and provided at predetermined intervals in a direction in which the video lines extend.

(5) In (4), the plural slits have a first group of slits and a second group of slits, and the first group of slits and the second group of slits are formed in line symmetry with each other about a line perpendicular to the video lines.

(6) A liquid crystal display device includes: a first substrate having a first electrode, an insulating film provided in an upper layer than the first electrode, and a second electrode provided in an upper layer than the insulating film; a second substrate; and a liquid crystal sandwiched between the first substrate and the second substrate. The liquid crystal display device drives the liquid crystal by generating an electric field by the first electrode and the second electrode. The second electrode has plural comb-tooth electrodes connected at one ends and opened at the other ends, the first electrode is a planar electrode superimposed on the plural comb-tooth electrodes, and, given that the length of the respective comb-tooth electrodes is Lk, the length Lk of the respective comb-tooth electrodes satisfies $12\ \mu m \leq Lk \leq 30\ \mu m$.

(7) In (6), the length Lk of the respective comb-tooth electrodes satisfies 12 μm≦Lk≦20 μm.

(8) In (6) or (7), the first substrate has video lines, and the plural comb-tooth electrodes are formed along a direction in which the video lines extend and provided at predetermined intervals in a direction perpendicular to the video lines.

(9) In (6) or (7), the first substrate has video lines, and the plural comb-tooth electrodes are formed at angles except 0° and 90° relative to a direction perpendicular to the video lines and provided at predetermined intervals in a direction in which the video lines extend.

(10) In (9), the plural comb-tooth electrodes have a first group of comb-tooth electrodes and a second group of comb-tooth electrodes, and the first group of comb-tooth electrodes and the second group of comb-tooth electrodes are formed in line symmetry with each other about a line perpendicular to the video lines.

(11) In any one of (1) to (10), the second electrode is a transparent electrode.

(12) In any one of (1) to (11), the first electrode is a transparent electrode.

(13) In any one of (1) to (12), the first electrode is an opposite electrode, and the second electrode is a pixel electrode.

The advantage obtained by the representative embodiment of the invention disclosed in this application is simply described as follows.

According to the liquid crystal display device of the invention, in a liquid crystal display device having a first planar electrode and a second electrode formed on the first electrode with an insulating film in between, the response time of a liquid crystal is made shorter than that in a related art.

BRIEF DESCRIPTION OF THE DRAWINGS

FIG. 3-1 is a graph showing a relationship between the length of slits of the pixel electrode and the response time of a liquid crystal.

FIG. 3-2 is a graph in which the part J1 of FIG. 3-1 is enlarged.

FIG. 4-1 is a graph showing a relationship between the length of comb-tooth electrodes of the pixel electrode and the response time of the liquid crystal.

FIG. 4-2 is a graph in which the part J2 of FIG. 4-1 is enlarged.

FIG. 5-1 is a plan view showing an example of an electrode configuration of one subpixel of a liquid crystal display panel of a comparative example.

FIG. 5-2 is a plan view showing another example of an electrode configuration of one subpixel of the liquid crystal display panel of the comparative example.

FIG. 7-1 is a plan view showing another example of an electrode configuration of one subpixel of the liquid crystal display panel of the comparative example.

FIG. 7-2 is a plan view showing another example of an electrode configuration of one subpixel of the liquid crystal display panel of the comparative example.

DESCRIPTION OF THE PREFERRED EMBODIMENTS

Hereinafter, embodiments of the invention will be described in detail with reference to the drawings.

In all of the drawings for explanation of the embodiments, the same signs will be assigned to those having the same functions and the repeated description thereof will be omitted.

Comparative Example

First, a liquid crystal display device of a comparative example will be described.

Figure 6:
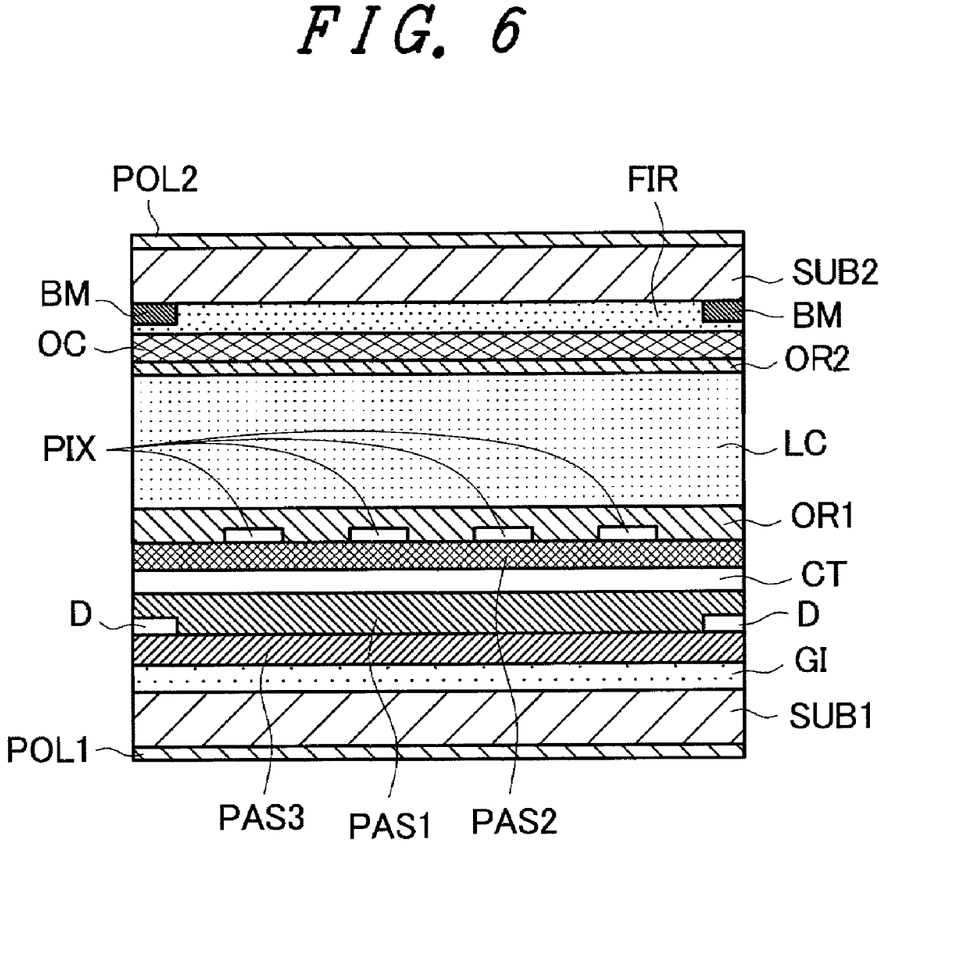
FIG. 6 is a sectional view showing a sectional structure along the section line A-A' shown in FIG. 5-1.
Figure 51:
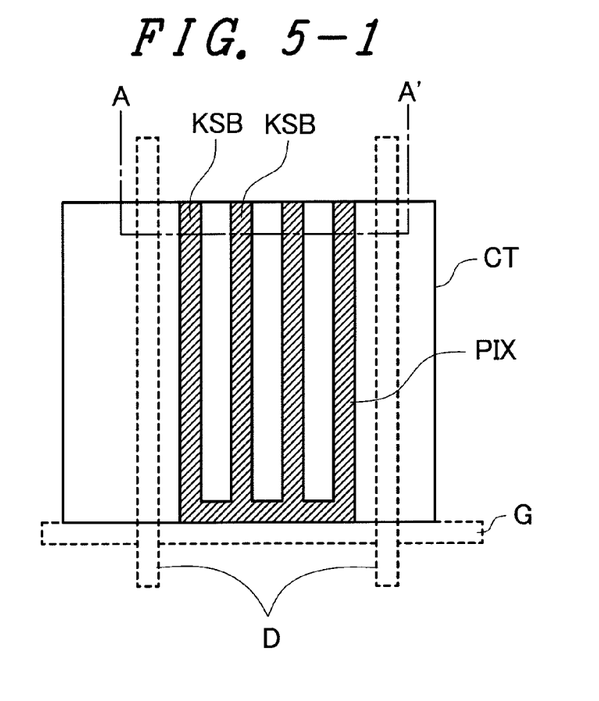

FIG. 5-1 is a plan view showing an example of an electrode configuration of one subpixel of the liquid crystal display panel of the comparative example. FIG. 6 is a sectional view showing a sectional structure along the section line A-A' shown in FIG. 5-1.

The liquid crystal display panel shown in the drawings is an IPS liquid crystal display panel using a planar opposite electrode and having a glass substrate (SUB2) and a glass substrate (SUB1) oppositely provided to each other with a liquid crystal layer LC in between as shown in FIG. 6. In the embodiment, the principal surface side of the glass substrate (SUB2) is the observation side.

At the liquid crystal layer LC side of the glass substrate (SUB2), shielding films (BM), a color filter layer (FIR), an overcoat layer (OC), and an orientation film (OR2) are formed sequentially from the glass substrate (SUB2) toward the liquid crystal layer LC. Additionally, a polarizer POL2 is provided on the outside of the glass substrate (SUB2).

Further, at the liquid crystal layer LC side of the glass substrate (SUB1), scanning lines (also referred to as gate lines, not shown) (G), a gate insulating film (GI), an interlayer insulating film (PAS3), video lines (also referred to as drain lines, source lines) (D), an interlayer insulating film (PAS1), a planar opposite electrode (CT), an interlayer insulating film (PAS2), a pixel electrode (PIX), and an orientation film (OR1) are formed sequentially from the glass substrate (SUB1) toward the liquid crystal layer LC. Additionally, a polarizer POL1 is provided on the outside of the glass substrate (SUB1).

Here, the pixel electrode (PIX) and the opposite electrode (CT) are formed of transparent conductive layers (e.g., ITO: Indium-Tin-Oxide). In FIG. 5-1, the pixel electrode (PIX) is a comb-like electrode having plural comb-tooth electrodes (KSB) connected at one ends, and four comb-tooth electrodes (KSB) are formed along a direction in which the video lines (D) extend and provided at predetermined intervals in a direction perpendicular to the video lines (D).

Figure 52:
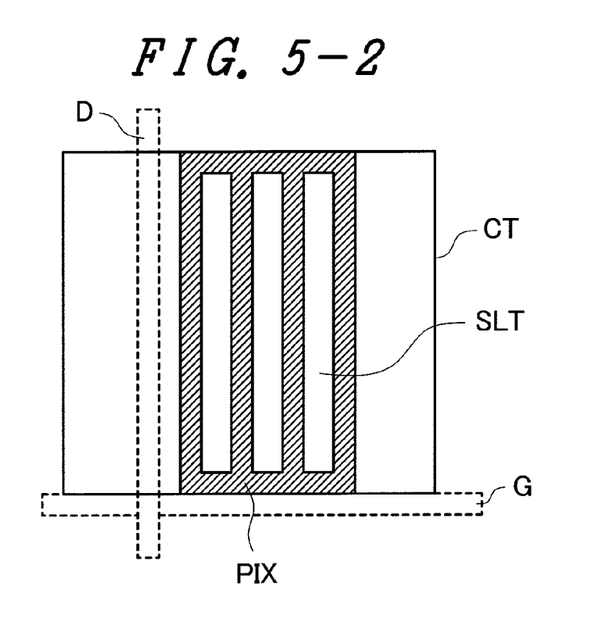

FIG. 5-2 is a plan view showing another example of an electrode configuration of one subpixel of the liquid crystal display panel of the comparative example.

The liquid crystal display panel shown in FIG. 5-2 differs from the liquid crystal display panel shown in FIG. 5-1 in that the pixel electrode (PIX) has slits (SLT) formed by removing the transparent conductive layer forming the electrode.

In FIG. 5-2, three slits (SLT) are formed along the direction in which the video lines (D) extend and provided at predetermined intervals in the direction perpendicular to the video lines (D).

Figure 71:
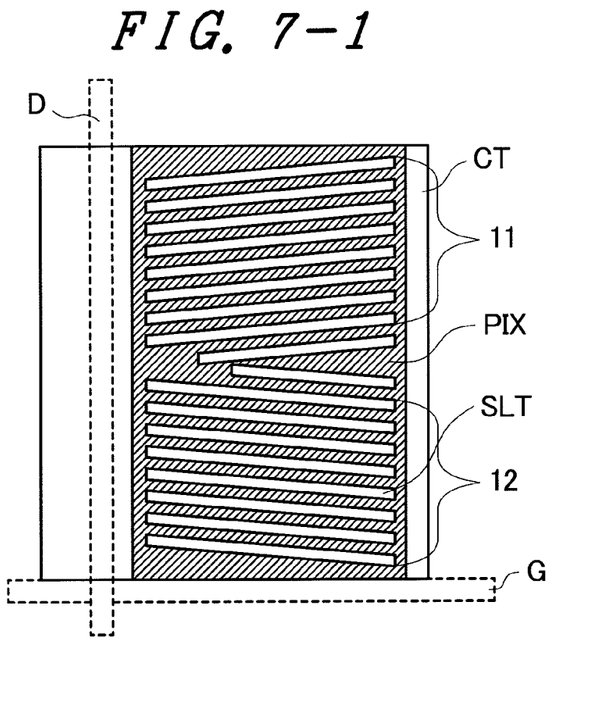

FIG. 7-1 is a plan view showing another example of an electrode configuration of one subpixel of the liquid crystal display panel of the comparative example.

In the liquid crystal display panel shown in FIG. 7-1, the pixel electrode (PIX) also has slits (SLT) formed by removing the transparent conductive layer forming the electrode, but the liquid crystal display panel shown in FIG. 7-1 differs from the liquid crystal display panel shown in FIG. 5-2 in that the respective slits (SLT) are formed at angles except 0° and 90° relative to the direction perpendicular to the video lines (D) and provided at predetermined intervals in the direction in which the video lines (D) extend.

Further, the plural slits (SLT) have a first group of slits (11) and a second group of slits (12), and the first group of slits (11) and the second group of slits (12) are formed in line symmetry (line symmetry except the part having a different shape) with each other about a line perpendicular to the video lines (D).

Figure 72:
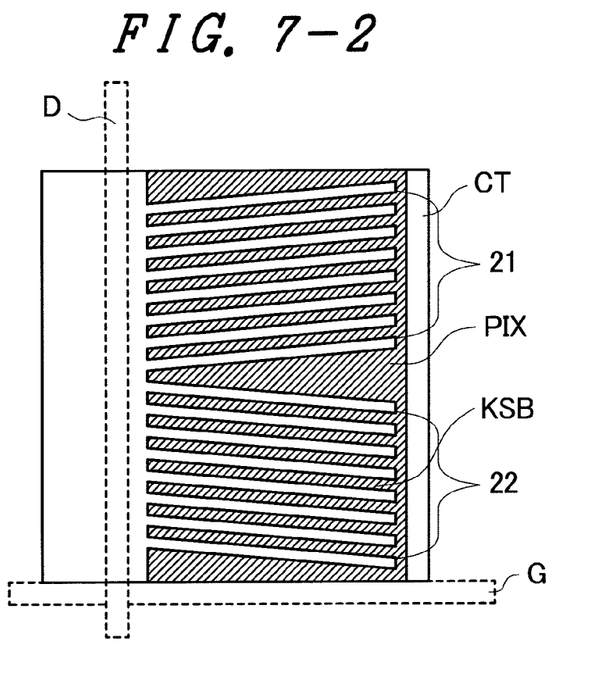

FIG. 7-2 is a plan view showing another example of an electrode configuration of one subpixel of the liquid crystal display panel of the comparative example.

In the liquid crystal display panel shown in FIG. 7-2, the pixel electrode (PIX) also is a comb-like electrode, but the liquid crystal display panel shown in FIG. 7-2 differs from the liquid crystal display panel shown in FIG. 5-1 in that the respective comb-tooth electrodes (KSB) are formed at angles except 0° and 90° relative to the direction perpendicular to the video lines (D) and provided at predetermined intervals in the direction in which the video lines (D) extend.

Further, the plural comb-tooth electrodes (KSB) have a first group of comb-tooth electrodes (21) and a second group of comb-tooth electrodes (22), and the first group of comb-tooth electrodes (21) and the second group of comb-tooth electrodes (22) are formed in line symmetry with each other about a line perpendicular to the video lines (D).

In the above described comparative example, the lengths of slits and comb-tooth electrodes are long.

EMBODIMENT

The electrode configuration of the liquid crystal display panel of the embodiment of the invention is the same as the electrode configuration shown in FIG. 5-1, 5-2, 7-1, or 7-2, and the inner sectional structure is also the same as the sectional structure shown in FIG. 6.

The liquid crystal display panel in the embodiment differs from the liquid crystal display panel of the comparative example in that the lengths of the slits (SLT) or comb-tooth electrodes (KSB) of the pixel electrode (PIX) are optimized.

Figure 1:
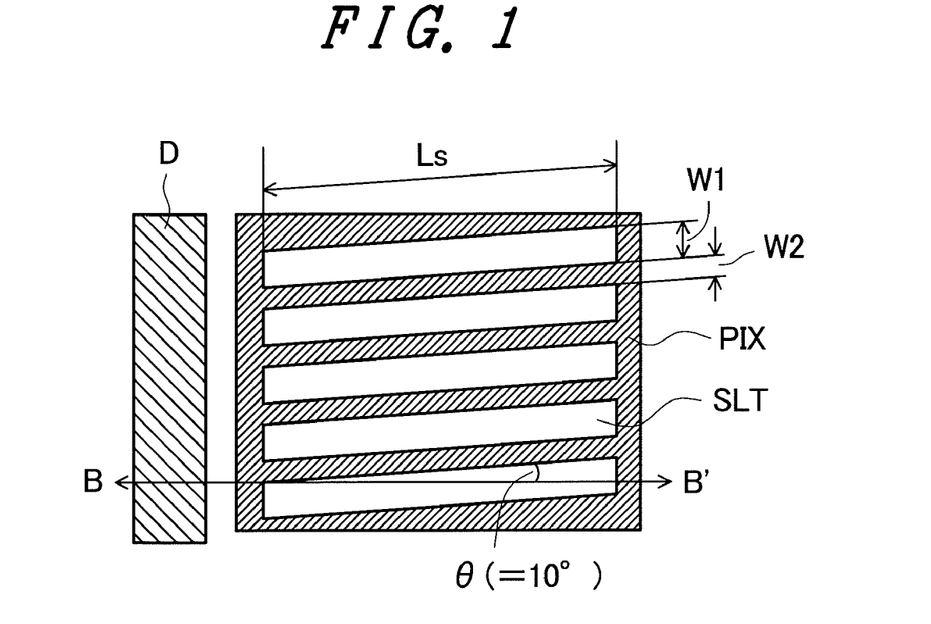
FIG. 1 is a plan view showing an electrode configuration of a pixel electrode of one subpixel of a liquid crystal display panel of an embodiment of the invention.

FIG. 1 is a plan view showing an electrode configuration of a pixel electrode (PIX) of one subpixel of the liquid crystal display panel of the embodiment of the invention. FIG. 1 is modeled based on FIG. 7-1.

The pixel electrode (PIX) shown in FIG. 1 has slits (SLT) formed by removing the transparent conductive layer forming the electrode, and the respective slits (SLT) are formed at a predetermined angle (θ) relative to the direction perpendicular to the video lines (D) (the direction along B-B' line in FIG. 1) and provided at predetermined intervals in the direction in which the video lines (D) extend. Here, θ is an angle of 0°<θ<90°, and set to 10° (θ=10°), for example.

Figure 31:
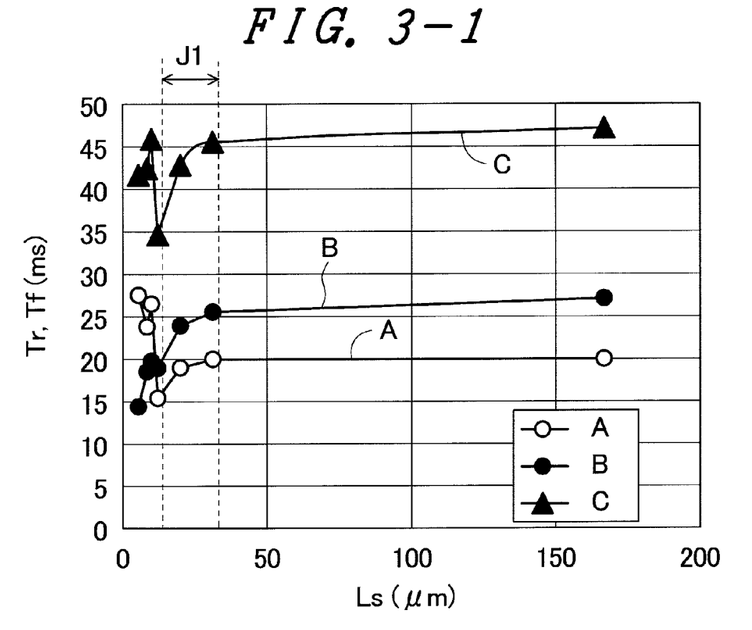
Figure 32:
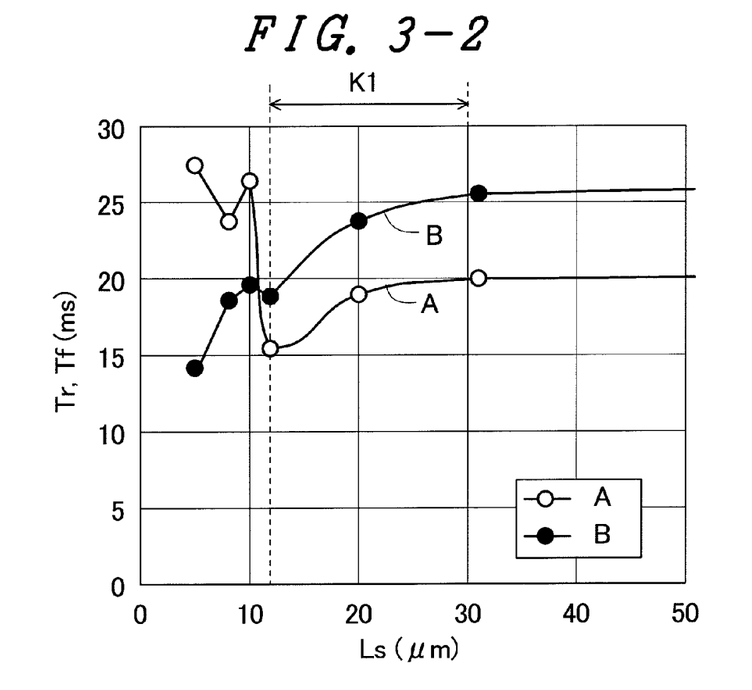

FIG. 3-1 is a graph showing a relationship between the length (Ls in FIG. 1) of the slits (SLT) of the pixel electrode (PIX) and the response time of the liquid crystal, and FIG. 3-2 is a graph in which the part J1 of FIG. 3-1 is enlarged. Here, Ls is a length of the slits (SLT) measured with respect to the longitudinal direction (the direction at θ=10°).

The graphs in FIGS. 3-1 and 3-2 are graphs showing simulation results of the response time when the length (Ls) of the slits (SLT) of the pixel electrode (PIX) is changed under the condition that the width of the slits (SLT) (W1 in FIG. 1) is 6 μm and the width of the transparent conductive layer sandwiched between the slits (SLT) (W2 in FIG. 1) is 3 μm.

Here, as shown in FIG. 8A, the luminance of "white" and the luminance of "black" of the image displayed on the liquid crystal display panel are normalized to 100% and 0%, respectively, and the time from time (T1) to time (Tr) at which the luminance achieves 90% and time from time (T2) to time (Tf) at which the luminance achieves 10% are defined as a rise time and a fall time, respectively.

In FIGS. 3-1 and 3-2, the curve indicated by A shows a rise time (Tr), the curve indicated by B shows a fall time (Tf), the curve indicated by C shows a time (Tr+Tf) obtained by adding the rise time (Tr) and the fall time (Tf).

As seen from the graphs in 3-1 and 3-2, when the length (Ls) of the slits (SLT) is set to a value of 12 μm≦Ls≦30 μm (in the range indicated by K1 in FIG. 3-2), the rise time (Tr) indicated by A in FIG. 3-2 can be made shorter than in the case where the length (Ls) of the slits (SLT) is Ls<12 μm or Ls>30 μm.

Further, also the fall time (Tf) indicated by B in FIG. 3-2 can be made shorter than in the case where Ls>30 μm. Note that the fall time (Tf) indicated by B in FIG. 3-2 maybe shorter than in the case where Ls<12, but it is desirable that the length (Ls) of the slits (SLT) is 12 μm≦Ls≦30 μm, more preferably, 12 μm≦Ls≦20 μm in view of the cost of manufacturing or the like. In the related art, the length (Ls) of the slits (SLT) is about 170 μm (Ls=170 μm).

In place of the electrode configuration shown in FIG. 1, as shown in FIG. 7-1, the plural slits (SLT) may be divided into a first group of slits (11) and a second group of slits (12), and the first group of slits (11) and the second group of slits (12) may be formed in line symmetry with each other about a line (B-B' line in FIG. 1) perpendicular to the video lines (D). In this case, the respective slits (SLT) of the second group of slits (12) are formed at a predetermined angle (−θ) relative to the direction perpendicular to the video lines (D) (the direction along B-B' line in FIG. 1).

Figure 2:
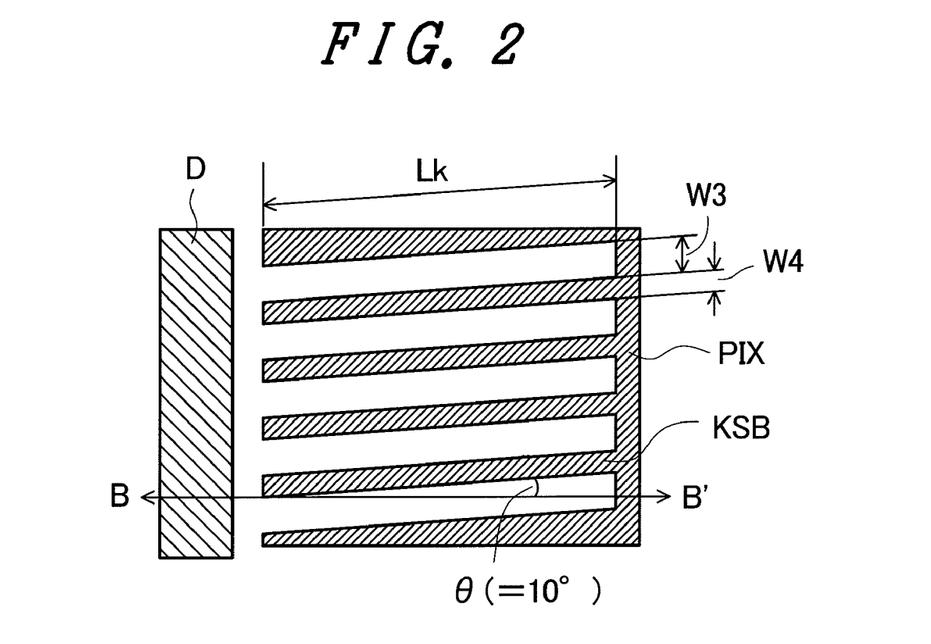
FIG. 2 is a plan view showing an electrode configuration of a pixel electrode of one subpixel of a liquid crystal display panel of a modified example of the invention.

FIG. 2 is a plan view showing an electrode configuration of a pixel electrode (PIX) of one subpixel of the liquid crystal display panel of the modified example of the invention. FIG. 2 is modeled based on FIG. 7-2.

The pixel electrode (PIX) shown in FIG. 2 is a comb-like electrode, and the respective comb-tooth electrodes (KSB) are formed at a predetermined angle (θ) relative to the direction perpendicular to the video lines (D) (the direction along B-B' line in FIG. 2) and provided at predetermined intervals in the direction in which the video lines (D) extend. Here, θ is an angle of 0°<θ<90°, and set to 10° (θ=10°), for example. The direction perpendicular to the video lines (D) (the direction along B-B' line in FIGS. 1,2) is the direction of initial orientation of liquid crystal molecules.

Figure 41:
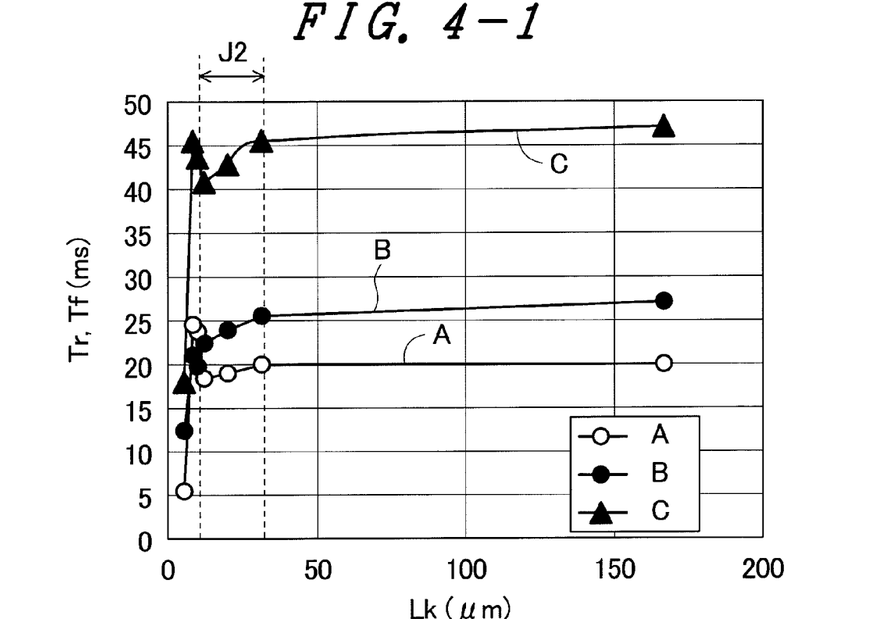
Figure 42:
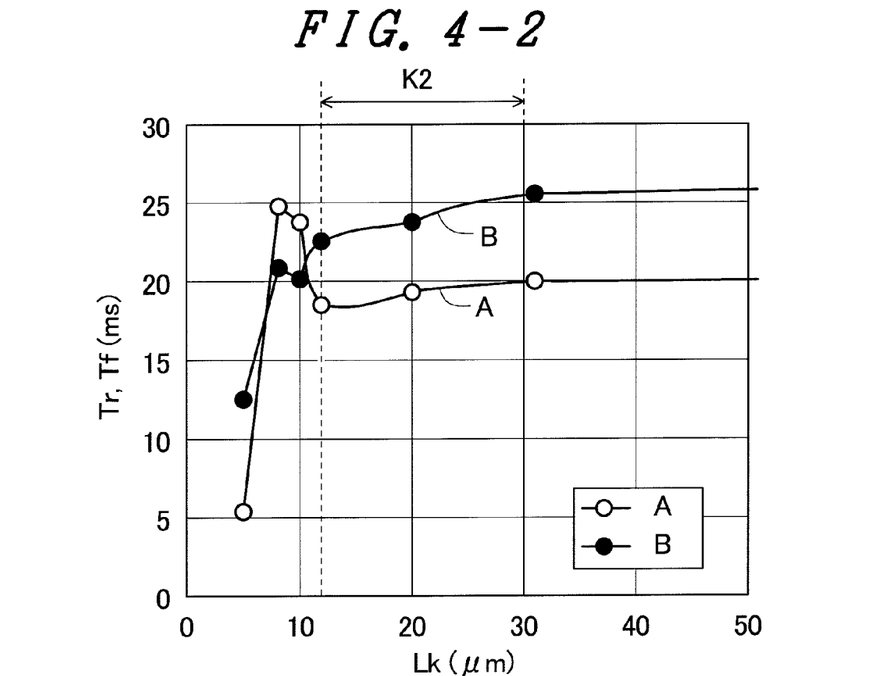

FIG. 4-1 is a graph showing a relationship between the length (Lk in FIG. 2) of the comb-tooth electrodes (KSB) of the pixel electrode (PIX) and the response time of the liquid crystal, and FIG. 4-2 is a graph in which the part J2 of FIG. 4-1 is enlarged.

The graphs in FIGS. 4-1 and 4-2 are graphs showing simulation results of the response time when the length (Lk) of the comb-tooth electrodes (KSB) of the pixel electrode (PIX) is changed under the condition that the width of the comb-tooth electrodes (KSB) (W4 in FIG. 2) is 3 μm and the interval of the comb-tooth electrodes (KSB) (W3 in FIG. 2) is 6 μm.

Here, Lk is a length of the comb-tooth electrodes (KSB) measured with respect to the longitudinal direction (the direction at θ=10°).

In FIGS. 4-1 and 4-2, the curve indicated by A shows a rise time (Tr), the curve indicated by B shows a fall time (Tf), the curve indicated by C shows a time (Tr+Tf) obtained by adding the rise time (Tr) and the fall time (Tf).

As seen from the graphs in 4-1 and 4-2, when the length (Lk) of the comb-tooth electrodes (KSB) is set in a range of Lk>10 μm to a value of 12 μm≦Lk≦30 μm (in the range indicated by K2 in FIG. 4-2), the rise time (Tr) indicated by A in FIG. 4-2 and the fall time (Tf) indicated by B in FIG. 4-2 can be made shorter than in the case where the length (Lk) of the comb-tooth electrodes (KSB) is Lk>30 μm.

Further, as shown in FIG. 4-2, the rise time (Tr) indicated by A in FIG. 4-2 and the fall time (Tf) indicated by B in FIG. 4-2 can also be made shorter than in the case where Lk<6 μm, but it is desirable that the length (Lk) of the comb-tooth electrodes (KSB) is 12 μm≦Lk≦30 μm, more preferably, 12 μm≦Lk≦20 μm in view of the cost of manufacturing or the like. In the related art, the length (Lk) of the comb-tooth electrodes (KSB) is about 150 μm (Lk=150 μm).

In place of the electrode configuration shown in FIG. 2, as shown in FIG. 7-2, the plural comb-tooth electrodes (KSB) may be divided into a first group of comb-tooth electrodes (21) and a second group of comb-tooth electrodes (22), and the first group of comb-tooth electrodes (21) and the second group of comb-tooth electrodes (22) are formed in line symmetry with each other about a line (B-B' line in FIG. 2) perpendicular to the video lines (D). In this case, the respective comb-tooth electrodes (KSB) of the second group of comb-tooth electrodes (22) are formed at a predetermined angle (−θ) relative to the direction perpendicular to the video lines (D) (the direction along B-B' line in FIG. 2).

As described above, in the embodiment, the response time of the liquid crystal can be reduced by optimizing the length (Ls) of the slits (SLT) of the pixel electrode (PIX) or length (Lk) of the comb-tooth electrodes (KSB).

The cases based on FIGS. 5-1 and 5-2 provide almost the same effect. Although the direction in which the video lines (D) extend is different in those in FIGS. 1 and 2, the same effect can be obtained because the effect of FIGS. 3 and 4 is not affected. The initial orientation direction of the liquid crystal is at an angle of 0°<θ<90° relative to the longitudinal direction of the slits (SLT) or the comb-tooth electrodes (KSB), and substantially the same as those in FIGS. 1 and 2. Accordingly, when the length (Ls) of the slits (SLT) or length (Lk) of the comb-tooth electrodes (KSB) are made equal to the length in the embodiment in FIGS. 5-1 and 5-2, the same effect can be obtained.

Further, in the above described embodiment, the comb-like pixel electrode (PIX) or pixel electrode (PIX) having slits is formed on the planar opposite electrode (CT) with the interlayer insulating film (PAS2) in between, however, a comb-like opposite electrode (CT) or comb-like opposite electrode (CT) having slits is formed on the planar pixel electrode (PIX) with the interlayer insulating film (PAS2) in between.

Furthermore, in the above explanation, the embodiment in which the invention is applied to the transmissive liquid crystal display device has been described, however, the invention is not limited to that, but may be applied to a semi-transmissive or reflective liquid crystal display device, for example.

In the case of the transmissive or semi-transmissive type, a back light (not shown) may be provided on the backside of the liquid crystal display panel. In the case of the reflective type, a front light (not shown) may be provided on the front side (observation side) of the liquid crystal display panel.

Heretofore, the invention made by the inventor has been specifically described according to the embodiment, however, needless to add, the invention is not limited to the embodiment and various changes can be made without departing from the scope of the invention.

What is claimed is:

1. A liquid crystal display device comprising:
a first substrate having a first electrode, an insulating film provided in an upper layer than the first electrode, and a second electrode provided in an upper layer than the insulating film;
a second substrate; and
a liquid crystal sandwiched between the first substrate and the second substrate,
the liquid crystal display device driving the liquid crystal by generating an electric field by the first electrode and the second electrode,
wherein the second electrode has plural slits closed at both ends,
the first electrode is a planar electrode superimposed on the plural slits, and
given that the length of the respective slits is Ls, the length Ls of the respective slits satisfies 12 μm≦Ls≦30 μm.

2. The liquid crystal display device according to claim 1, wherein the length Ls of the respective slits satisfies 12 μm≦Ls≦20 μm.

3. The liquid crystal display device according to claim 1, wherein the first substrate has video lines, and
the plural slits are formed along a direction in which the video lines extend and provided at predetermined intervals in a direction perpendicular to the video lines.

4. The liquid crystal display device according to claim 1, wherein the first substrate has video lines, and
the plural slits are formed at angles except 0° and 90° relative to a direction perpendicular to the video lines and provided at predetermined intervals in a direction in which the video lines extend.

5. The liquid crystal display device according to claim 4, wherein the plural slits have a first group of slits and a second group of slits, and
the first group of slits and the second group of slits are formed in line symmetry with each other about a line perpendicular to the video lines.

6. The liquid crystal display device according to claim 1, wherein the second electrode is a transparent electrode.

7. The liquid crystal display device according to claim 1, wherein the first electrode is a transparent electrode.

8. The liquid crystal display device according to claim 1, wherein the first electrode is an opposite electrode, and
the second electrode is a pixel electrode.

9. A liquid crystal display device comprising:
a first substrate having a first electrode, an insulating film provided in an upper layer than the first electrode, and a second electrode provided in an upper layer than the insulating film;
a second substrate; and
a liquid crystal sandwiched between the first substrate and the second substrate,
the liquid crystal display device driving the liquid crystal by generating an electric field by the first electrode and the second electrode,
wherein the second electrode has plural comb-tooth electrodes connected at one ends and opened at the other ends,
the first electrode is a planar electrode superimposed on the plural comb-tooth electrodes, and given that the length of the respective comb-tooth electrodes is Lk, the length Lk of the respective comb-tooth electrodes satisfies 12 µm≦Lk≦30 µm.

10. The liquid crystal display device according to claim 9, wherein the length Lk of the respective comb-tooth electrodes satisfies 12 µm≦Lk≦20 µm.

11. The liquid crystal display device according to claim 9, wherein the first substrate has video lines, and
the plural comb-tooth electrodes are formed along a direction in which the video lines extend and provided at predetermined intervals in a direction perpendicular to the video lines.

12. The liquid crystal display device according to claim 9, wherein the first substrate has video lines, and
the plural comb-tooth electrodes are formed at angles except 0° and 90° relative to a direction perpendicular to the video lines and provided at predetermined intervals in a direction in which the video lines extend.

13. The liquid crystal display device according to claim 12, wherein the plural comb-tooth electrodes have a first group of comb-tooth electrodes and a second group of comb-tooth electrodes, and
the first group of comb-tooth electrodes and the second group of comb-tooth electrodes are formed in line symmetry with each other about a line perpendicular to the video lines.

* * * * *